United States Patent
Carlsson et al.

(10) Patent No.: US 7,092,381 B2
(45) Date of Patent: Aug. 15, 2006

(54) DELIVERY OF BROADCAST TELESERVICE MESSAGES OVER PACKET DATA NETWORKS

(75) Inventors: Hans Carlsson, Cary, NC (US); John Diachina, Garner, NC (US); Gunnar Rydnell, Ravlanda (SE)

(73) Assignee: Telefonaktiebolaget LM Ericsson (publ), (SE)

( * ) Notice: Subject to any disclaimer, the term of this patent is extended or adjusted under 35 U.S.C. 154(b) by 913 days.

(21) Appl. No.: 09/751,250

(22) Filed: Dec. 29, 2000

(65) Prior Publication Data

US 2002/0085537 A1    Jul. 4, 2002

(51) Int. Cl.
*H04L 12/66* (2006.01)
*H04J 3/22* (2006.01)

(52) U.S. Cl. .................... 370/352; 370/395.5; 370/466
(58) Field of Classification Search ........ 370/400–401, 370/315, 328, 338, 352–398, 465–469, 463
See application file for complete search history.

(56) References Cited

U.S. PATENT DOCUMENTS

| | | | |
|---|---|---|---|
| 5,838,782 A | 11/1998 | Lindquist | |
| 5,852,660 A | 12/1998 | Lindquist et al. | |
| 5,903,851 A * | 5/1999 | Backstrom et al. | 455/557 |
| 6,018,657 A | 1/2000 | Kennedy, III et al. | |
| 6,192,055 B1 * | 2/2001 | Rasanen | 370/465 |
| 6,333,919 B1 * | 12/2001 | Gaffney | 370/254 |
| 6,389,008 B1 * | 5/2002 | Lupien et al. | 370/352 |
| 6,393,014 B1 * | 5/2002 | Daly et al. | 370/352 |
| 6,463,055 B1 * | 10/2002 | Lupien et al. | 370/353 |
| 6,600,732 B1 * | 7/2003 | Sevanto et al. | 370/349 |
| 6,636,502 B1 * | 10/2003 | Lager et al. | 370/352 |
| 6,671,287 B1 * | 12/2003 | Huttunen et al. | 370/469 |
| 6,747,989 B1 * | 6/2004 | Sevanto | 370/466 |
| 6,879,997 B1 * | 4/2005 | Ketola et al. | 709/208 |
| 2002/0034935 A1 * | 3/2002 | Bjelland et al. | 455/403 |

FOREIGN PATENT DOCUMENTS

EP      1117264 A2 *   7/2001
WO    WO 9953704 A1 * 10/1999

OTHER PUBLICATIONS

Faccin et al., GPRS and IS-136 Integration for Flexible Network and Services Evolution, Jun. 1999, Nokia Research Center, IEEE Personal Communications, 1070-9916/99, pp. 48-54.*

* cited by examiner

*Primary Examiner*—Chi Pham
*Assistant Examiner*—Tri H. Phan
(74) *Attorney, Agent, or Firm*—Coats & Bennett, P.L.L.C.

(57) ABSTRACT

A communication network comprises a broadcast teleservice message center generating broadcast teleservice messages. The broadcast teleservice message center is connected to a circuit-switched network over an interface that uses a first messaging protocol. The broadcast teleservice message center includes an interworking function to connect the broadcast teleservice message center to a packet-switched network over an interface that uses a second messaging protocol. Broadcast teleservice messages transmitted over said first interface to mobile terminals having service with the said circuit-switched network are converted by the interworking function to a format specified by the second messaging protocol for delivery over the packet-switched network to mobile terminals having service with the packet-switched network.

23 Claims, 5 Drawing Sheets

DELIVERY OF BROADCAST TELESERVICE MESSAGES OVER PACKET DATA NETWORKS

BACKGROUND OF THE INVENTION

The present invention relates to broadcast teleservices for mobile communications networks and more particularly to a method for delivering broadcast teleservice messages over packet data networks.

In a conventional mobile communication network, a mobile terminal must register with the network in order to receive services. The mobile communication network typically provides voice services, but may also include more advanced services such as short message services (SMS), data services, and broadcast teleservices. Data services allow users to send and receive data, such as facsimile data, over wireless communication channels. SMS allows a user to send and receive short text messages. Broadcast teleservices allow a user to receive messages that are broadcast over a geographic area to all users or to a group of users. Broadcast teleservices are used, for example, to broadcast weather forecasts, sports scores, news, and other information to mobile terminals.

The Telecommunications Industry Association/Electronic Industry Alliance (TIA/EIA) has developed a protocol to provide transport for broadcast teleservices, which has been incorporated into its standard for PCS/Cellular Systems (known as TIA/EIA-136). This protocol is known as the Broadcast Air Interface Transport Service (BATS). BATS allows a mobile terminal camped on a digital control channel (DCCH) to receive broadcast teleservice messages. To briefly summarize, the forward DCCH includes a logical channel, called the Broadcast Control Channel (BCCH), that carries broadcast teleservice messages. The BCCH comprises three sub-channels—the Fast Broadcast Control Channel (F-BCCH), the Extended Broadcast Control Channel (E-BCCH), and the SMS Broadcast Control Channel (S-BCCH). The F-BCCH and E-BCCH carry system-related information and operating parameters needed to mobile terminals to acquire and maintain service on the network. The S-BCCH carries SMS messages and other broadcast teleservice messages. A BATS-specific protocol includes functions for assigning and announcing sub-channels of the S-BCCH that carry specific types of broadcast teleservice messages. For example, different sub-channels may be defined to carry weather, new, sports scores, etc. This protocol allows mobile terminals to receive the desired broadcast teleservices in which the user has an interest.

Data services are also becoming more popular and demand for such services is growing rapidly. As demand for data services grows, mobile communication service providers are moving from circuit-switched networks, which were originally designed for voice communications, to packet-switched networks, which are better suited for data communications.

In a circuit-switched (CS) network, the communication path between the originating and terminating users is fixed for the entire duration of the call. That is, the mobile switching center (MSC) dedicates a voice channel connection between the calling party and called party for the entire duration of the call. A call-setup procedure is required to allocate network resources. Since the transmission path is fixed, data arrives at the final destination in the exact order it was transmitted. A CS network relies heavily on error control coding to protect messages from errors in transmission. In general, CS networks work well for voice communications but are not well-suited for certain types of data services.

In a packet-switched (PS) network, a dedicated connection is not required. Instead of a dedicated connection that is allocated for the duration of a call, a PS network breaks the message into packets and transmits each packet individually over the network. Each packet contains routing information and is individually routed over the network to the final destination. Thus, successive packets in the same message may arrive at the final destination through different routes. If some packets get lost during transmission, there is sufficient redundancy to allow the entire message to be reconstructed at the final destination. Because a dedicated connection is not required, packet-switched networks are sometimes referred to as being connectionless. While requiring more overhead to transmit each packet, a packet-switched network does not tie up system resources and a call set-up procedure is not required. PS networks are ideal for data communications, particularly data communications of a bursty nature, such as Internet browsing.

A Class B mobile terminal is defined as a terminal that may connect to a conventional, CS network for voice communications, or to PS network for data communications. For data services, the mobile terminal registers with the PS network in order to receive packet data services, also known as datagram services, and then camps on a control channel called the Packet Common Control Channel (PCCCH). After registration with the PS network, the mobile terminal may also register with a conventional CS network for voice communications while still camping on the PCCCH. Registration with the CS network may be accomplished through a tunneled connection between the PS network and the CS network. After registration, paging messages originating in the CS network are routed via the PS network and transmitted to the mobile terminal on the PCCCH.

Currently, broadcast teleservices are not provided on the PCCCH. Broadcast teleservice is provided only on the DCCH in the CS mobile communication network. Thus, when a Class B mobile terminal is camping on the PCCCH, it is unable to receive BATS-based broadcast teleservice messages.

BRIEF SUMMARY OF THE INVENTION

The present invention is a new network architecture for a communications network and method for delivering broadcast teleservice messages over a packet-switched network, such as a General Packet Radio Service (GPRS) network. A broadcast message center (BMC) generates broadcast teleservice messages for delivery to mobile terminals having service with a circuit-switched network. In this case, the broadcast teleservice messages are formatted for delivery to a mobile switching center (MSC) that uses BATS for delivery of these messages over the BCCH of a DCCH. The BMC may also include an interworking function to format the broadcast teleservice messages for delivery over a packet-switched network to mobile terminals having service with the packet-switched network (i.e., camping on a PCCCH). The interworking function may, for example, interconnect the BMC with a GPRS network. The broadcast teleservice message may comprise service-related information or non-service-related information. Service-related information may comprise, for example, an intelligent roaming database (IRDB) download. Non-service-related information may comprise, for example, news, sports scores, the forecast, etc.

DETAILED DESCRIPTION OF THE INVENTION

Figure 1:
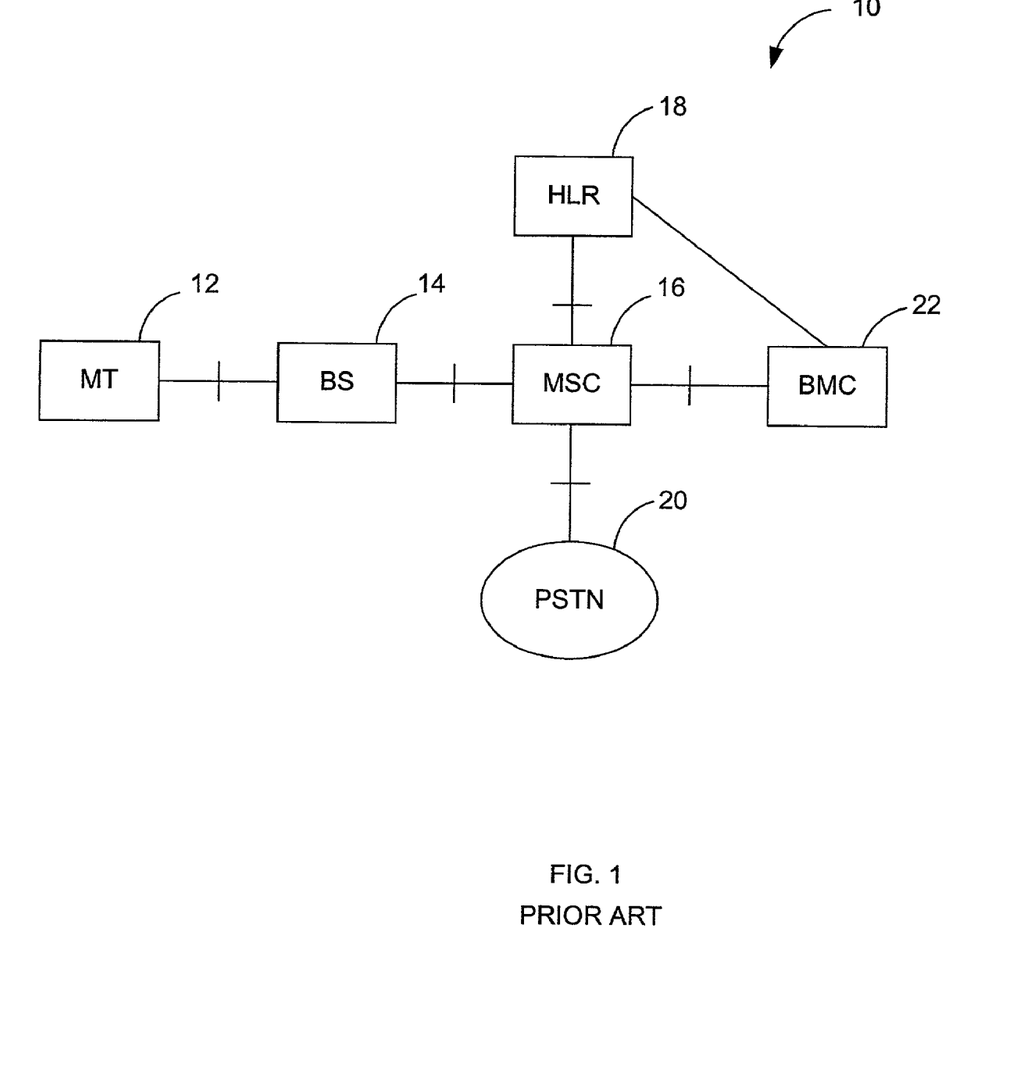
FIG. 1 is a schematic diagram illustrating the logical entities in a circuit-switched network having a broadcast message center.

Referring now to the drawings, FIG. 1 shows the logical architecture of a typical circuit-switched mobile communication network, indicated generally by the numeral 10. The mobile communication network 10 comprises a plurality of mobile terminals 12, a plurality of base stations 14, and one or more mobile switching centers (MSCs) 16. The mobile terminal 12, which may be mounted in a vehicle or used as a portable hand-held unit, typically contains a transceiver, antenna, and control circuitry. The mobile terminal 12 communicates over a radio frequency channel with a serving base station 14 and may be handed-off to a number of different base stations 14 during a call. Each base station 14 is located in, and provides service to a geographic region referred to as a cell. In general, there is one base station 14 for each cell within a given network 10. The base station 14 comprises several transmitters and receivers and can simultaneously handle many different calls. The base station 14 connects via a telephone line or microwave link to the MSC 16. The MSC 16 coordinates the activities of the base stations 12 within the communication network 10 and connects the mobile communication network 10 to public networks, such as the Public Switched Telephone Network (PSTN) 20. The MSC 16 routes calls to and from the mobile terminals 12 through the appropriate base station 14 and coordinates handoffs as the mobile terminal 12 moves from one cell within the mobile communication network 10 to another cell. Information concerning the location and activity status of subscribing mobile terminals 12 is stored in a Home Location Register (HLR) 18. The MSC 16 also contains a Visitor Location Register (VLR) containing information about mobile terminals 12 roaming outside of their home territory.

The mobile communication network 10 of FIG. 1 further comprises a Broadcast Message Center (BMC) 22 for providing broadcast teleservices to mobile terminal users. BMC 22 determines the content of broadcast teleservice messages, how frequently broadcast teleservice messages are broadcast, and what channels to use for broadcast teleservice messages. BMC 22 is connected to the MSC 16. The BMC 22 provides the content of, and instructions for, broadcasting teleservice messages to the MSC 16, which is responsible for the scheduling of the broadcast teleservice messages.

The delivery of broadcast teleservice messages to mobile terminals 12 uses the Broadcast Air Interface Transport Service (BATS) described in the Telecommunication Industry Association/Electronics Industry Association (TIA/EIA) standard TIA/EIA-136-630, and TIA/EIA/IS-824, which is incorporated herein by reference. To briefly summarize, broadcast teleservice messages are broadcast to mobile terminals 12 on the Short Message Service Broadcast Control Channel (S-BCCH) using the Broadcast Air Interface Transport Service (BATS). The S-BCCH is a logical channel used to deliver broadcast teleservice messages to a mobile terminal 12 and is a sub-channel of the Digital Control Channel (DCCH). BATS provides point-to-multipoint delivery of messages. Currently, BATS supports up to 32 distinct sub-channels of information. In order to allow mobile terminals 12 to readily determine the configuration of the S-BCCH on a given DCCH, S-BCCH sub-channels 0 and 1 carry messages that provide overhead information, such as the broadcast channel configuration, change notices, and sub-channel schedules. By reading messages on sub-channels 0 and 1, mobile terminals 12 can determine the sub-channels of interest and program schedules for those sub-channels. Sub-channels 2–31 of the S-BCCH carry broadcast teleservice messages belonging to a specific category of information determined by the BMC 22. Sub-channels 2–31 are used to transmit the information of interest to the mobile terminal 12.

After acquiring service with the mobile communication network 10, the mobile terminal 12 camps on the DCCH. Since the S-BCCH is a sub-channel of the DCCH, the mobile terminal 12 can read messages on the S-BCCH while it is camped on the DCCH without missing any paging messages or other service-related broadcasts on the DCCH.

Figure 2:
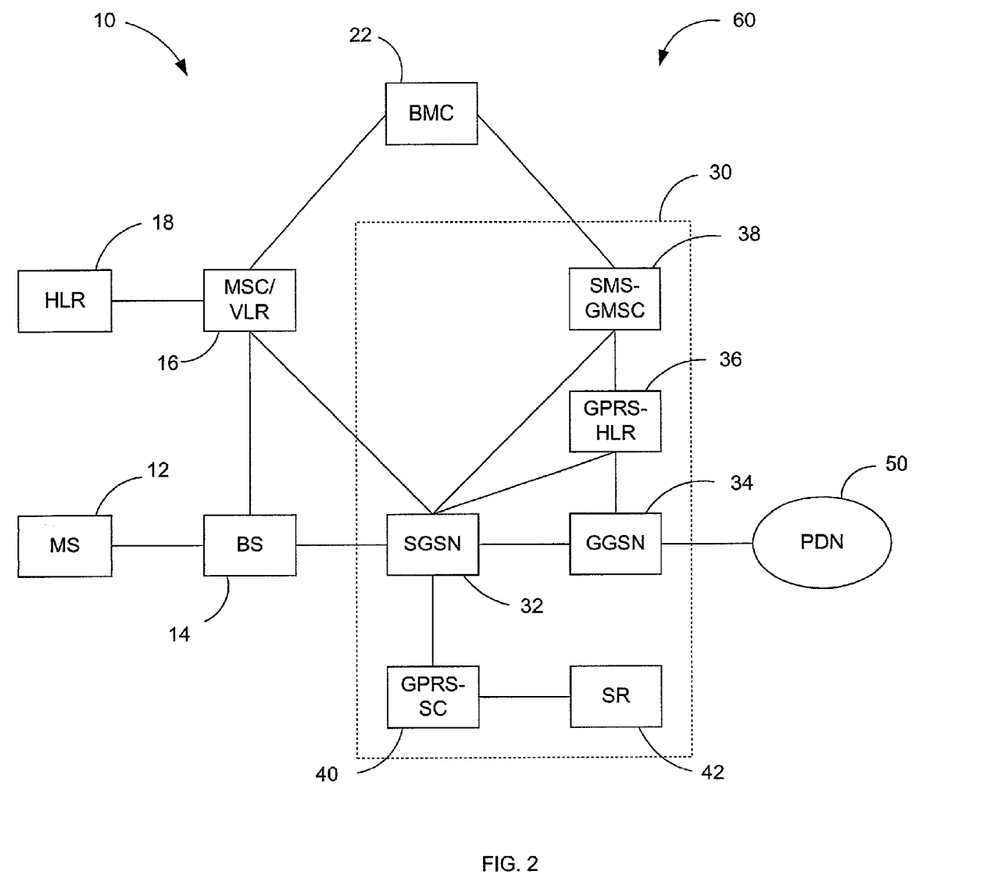
FIG. 2 is a block diagram illustrating a packet-switched network interfaced with the circuit-switched network of FIG. 1.

FIG. 2 shows the logical architecture of a packet-switched network 30 interfaced with the mobile communication network 10 of FIG. 1 to form a combined communication network 60. For illustrative purposes, the packet-switched network 30 implements the General Packet Radio Service (GPRS) developed for Global System for Mobile Communications (GSM) networks, though other standards may be employed. The packet-switched network 30 of FIG. 2 comprises at least one Serving GPRS Support Node (SGSN) 32, one or more Gateway GPRS Support Nodes (GGSN) 34, a GPRS Home Location Register (GPRS-HLR) 36, a Short Message Service Gateway MSC (SMS-GMSC) 38, and a GPRS Service Center (GPRS-SC) 40. The packet-switched network 30 also includes a base station 14, which in FIG. 2 is the same base station 14 used by the circuit-switched network 10.

The SGSN 32, which is at the same hierarchical level as the MSC 16, contains the functionality required to support GPRS. SGSN 32 provides network access control for packet-switched network 30. Network access is the means by which a user is connected to a telecommunications network in order to use the services of the network. The SGSN 32 connects to the base station 14, typically by a Frame Relay Connection. In the packet-switched network 30, there may be more than one SGSN 32.

The GGSN 34 provides interworking with external packet-switched networks, referred to as packet data networks (PDNs) 50, and is typically connected to the SGSN 32 via a backbone network using the X.25 or TCP/IP protocol. The GGSN 34 may also connect the packet-switched network 30 to other public land mobile networks (PLMNs). The GGSN 34 is the node that is accessed by the external packet data network 50 to deliver packets to a mobile terminal 12 addressed by a data packet. Data packets originating at the mobile terminal 12 addressing nodes in the external PDN 50 also pass through the GGSN 34. Thus, the GGSN 34 serves as the gateway between users of the packet-switched network 30 and the external PDN 50, which may, for example, be the Internet or other global network. The SGSN 32 and GGSN 34 functions can reside in separate nodes of the packet-switched network 30 or may be in the same node.

The GPRS-HLR 36 performs functions analogous to HLR 18 in the circuit-switched network. GPRS-HLR 36 stores subscriber information and the current location of the subscriber. The SMS-GMSC 38 contains the functionality required to support SMS over GPRS radio channels. SMS-GMSC 38 provides access to the Point-to-Point (PTP) messaging services.

The GPRS-SC 40 is a point-to-multipoint service center. GPPS-SC 40 provides access to the GPRS Point-to-Multipoint Multicast (PTM-M) service. PTM-M service is a broadcast service used to broadcast point-to-point (PTM) messages to user groups. The GPRS-SC 40 can be accessed via the Gm interface and connects with the SGSN 32 over the Gn interface. The Multicast Service Access Protocol (MSAP) allows an external entity connected to the GPRS-SC 40 to access the PTM-M service. This protocol provides the GPRS-SC 40 with all the necessary information, e.g. number of repetitions, interval, data, needed to initiate a PTM-M transaction. GPRS-SC 40 is responsible for scheduling, transmission, and retransmission of PTM-M data. The scheduling function controls the number of repetitions and the interval between repetitions. The GPRS-SC 40 stores the PTM-M data and sends it to all the involved SGSNs 32 each time a transmission or retransmission is triggered by the scheduling function. GPRS-SC 40 is also responsible for geographic routing of PTM-M data. The geographical area defined by the service requester 42 is translated into a cell list by the GPRS-SC 40 based on the network topology.

A mobile terminal 12 that has packet data functionality must register with the SGSN 32 to receive packet data services. Registration is the process by which the mobile terminal ID is associated with the user's address(es) in the packet-switched network 30 and with the user's access point(s) to the external PDN 50. After registration, the mobile terminal 12 camps on a Packet Common Control Channel (PCCCH). A mobile terminal 12 registered for packet data services is referred to herein as a GPRS-attached mobile terminal 12.

If the GPRS-attached mobile terminal 12 is also capable of voice services, it may register with the MSC 16 to receive voice services and SMS services on the circuit-switched network 10 after registration with the SGSN 32. Registration with the MSC 16 may be accomplished using a tunneling protocol between the SGSN 32 and MSC 16 to perform an International Mobile Identity Subscriber (IMSI) attach procedure. A mobile terminal 12 that is registered with the MSC 16 is referred to herein as an IMSI-attached mobile terminal 10. When the IMSI attach procedure is performed, an association is created between the SGSN 32 and MSC 16 to provide for interactions between the SGSN 32 and MSC 16. The association is used to coordinate activities for mobile terminals 12 that are both GPRS-attached and IMSI-attached. For example, the MSC 16 can execute paging requests for circuit-switched services via the SGSN 32. However, a GPRS-attached mobile terminal 12 camped on a PCCCH will not receive broadcast teleservice messages, which are transmitted on a DCCH in the circuit-switched network 10. For purposes of this application, broadcast teleservice messages are point-to-multipoint messages and may comprise service-related data or non-service-related data.

In the past, two methods were used for delivery of broadcast teleservice messages to a GPRS-attached mobile terminal 12. In each case, the BMC 22 schedules a broadcast teleservice message to be delivered on the S-BCCH and sends the message to the MSC 16. The MSC 16, upon receiving instructions from the BMC 22, schedules the message using the BATS protocol and sends it out on the S-BCCH in the cells indicated by the service request from the BMC 22. A class A terminal is defined as a terminal capable of simultaneous operation on both a packet channel (e.g., a PCCCH) and a circuit channel (e.g., a DCCH) such that it will not be forced to miss transmissions made on one channel in order to receive transmissions on the other. A class A mobile terminal 12 that has performed a successful GPRS attach procedure and that has registered with the circuit-switched network 10 can periodically tune to the DCCH channel and read subchannels 0 and 1 on the S-BCCH to determine what type of broadcast information is present in which subchannels on the S-BCCH. At the same time, the class A mobile terminal 12 can continue monitoring the paging channel on the PCCCH. The class A mobile terminal 12 reads the selected S-BCCH subchannels determined to be of interest while continuing to monitor the paging channel on the PCCCH. While reading the broadcast teleservice messages of interest, the class A mobile terminal 12 continues monitoring subchannels 0 and 1 of the S-BCCH for change notifications.

In the case of a class B mobile terminal, the mobile terminal 12 can periodically tune to the DCCH channel and read subchannels 0 and 1 of the BCCH to determine what type of broadcast information is present on the S-BCCH. The class B mobile terminal 12 then reads the S-BCCH subchannels of interest. While reading the S-BCCH, the class B mobile terminal 12 cannot continue monitoring the paging channel on the PCCCH and, thus, may miss some paging messages. After reading the S-BCCH channels of interest, the class B mobile terminal 12 returns to monitoring the paging channel on the PCCCH. Change notifications may be tunneled from the circuit-switched network 10 to the class B mobile terminal 12 via the SGSN 32 (on the Gs interface) to provide notification to GPRS-attached mobile terminals 12 of changes in the content of broadcast teleservice messages. In the case a change notification is received by the class B mobile terminal 12 on the paging channel of the PCCCH, the class B mobile terminal 12 tunes to the DCCH channel and reads the selected S-BCCH subchannels of interest. If the change notification message is not tunneled from the circuit-switched network 10, the class B mobile terminal 12 must switch back and forth between the DCCH and PCCCH and will, therefore, be frequently out-of-reach on both the DCCH and PCCCH.

Figure 3:
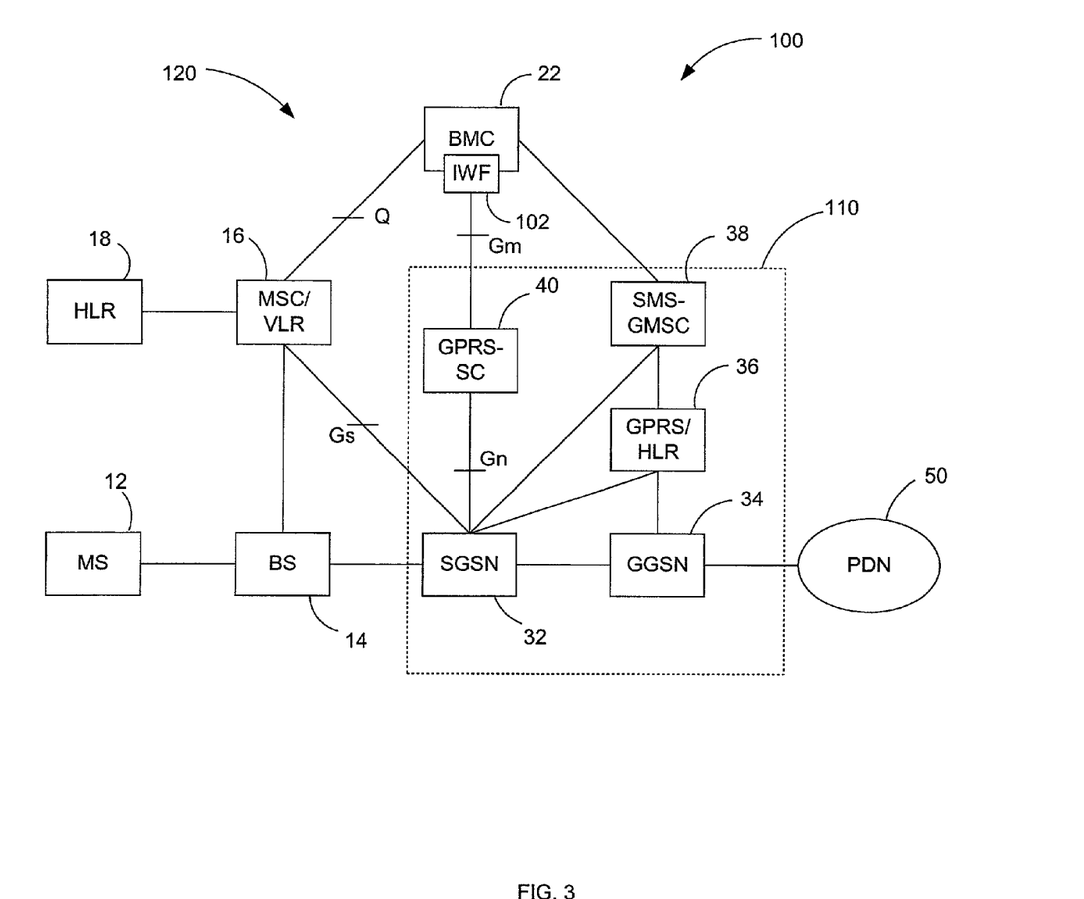
FIG. 3 is a block diagram illustrating a communications network comprising a circuit-switched network and a packet-switched network with an interworking function operatively connecting the broadcast message center to the packet-switched network.
Figure 4:
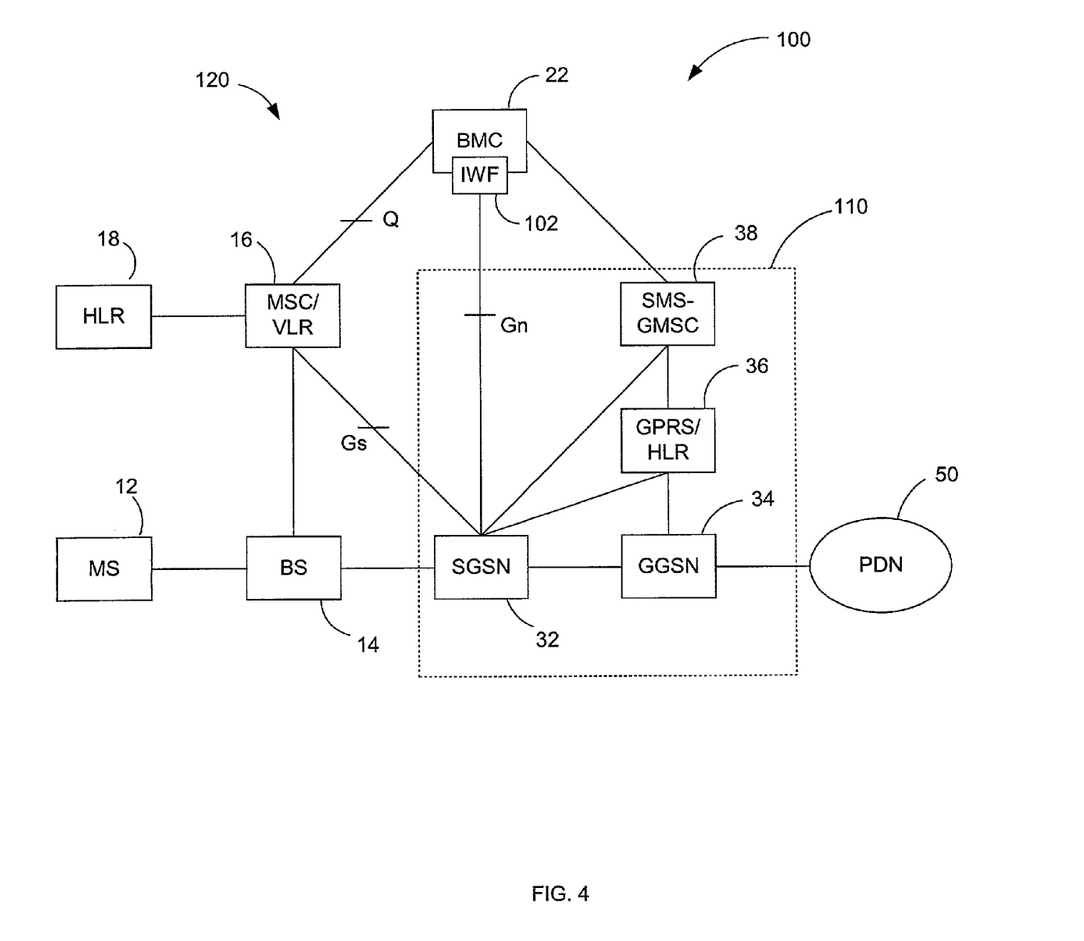
FIG. 4 is an alternate embodiment of the communications network of FIG. 3.

The present invention provides a new network architecture and method for delivery of broadcast teleservice messages to GPRS-attached mobile terminals 12, which are suitable for both class A and class B mobile terminals 12. The mobile communication network 100 of the present invention is shown in FIGS. 3 and 4 and comprises a circuit-switched network 120 and a packet-switched network 110 interfaced together. The circuit-switched network 120 and packet-switched network 110 comprise many of the same functional entities as the prior art mobile communication network 60 and, therefore, reference numbers used to describe the prior art mobile communication network 60 will be used to describe corresponding parts of the mobile communication network 100 of the present invention. The circuit-switched network 120 comprises a plurality of mobile terminals 12, base station 14, MSC 16, and HLR 18. These elements of the circuit-switched network 120 perform the same functions as the corresponding elements of the circuit-switched network 10 in FIG. 1. Circuit-switched network 120 interfaces with the packet-switched network 110, which includes an SGSN 32, GGSN 34, GPRS-HLR 36, SMS-GMSC 38, and GPRS-SC 40. These elements perform the same functions as the corresponding elements in packet-switched network 30 of FIG. 1, with the additional functionalities described below. The mobile communication network 100 of the present invention further includes an interworking function 102. The interworking function 102 is connected between the BMC 22 in the circuit-switched network 120 and packet-switched network 110. In particular, the interworking function 102 connects to the GPRS-SC 40 over the Gm interface, as shown in FIG. 3. The GPRS-SC 40 is connected to the SGSN 32 via the Gn interface. The Gm and Gn interfaces are defined in the GSM Technical Specification GSM 03.61 (version 0.7.1) published by the European Telecommunications Standards Institute (ETSI), which are well known to those skilled in the art.

In the circuit-switched network 120, the BMC 22 connects to the MSC 16 via an interface that uses the BATS protocol. Interworking function 102 translates broadcast teleservice messages normally transmitted to the MSC 16 into a format appropriate for delivery to the GPRS-SC 40 on the Gm interface. The GPRS-SC 40 then schedules a PTM-M message to be delivered on the PCCCH. The GPRS-SC 40 sends the PTM-M message to the SGSN 32 via the Gn interface, which sends the message to the base station 14 for transmission over the air interface to the mobile terminal 12.

PTM-M service includes scheduling and notification features comparable to those used by the BATS protocol. A PTM-M message on the PCCCH is broadcast in selected geographic areas. The PTM-M message may be addressed to all mobile terminals 12 in the selected areas or to a group of mobile terminals 12. In order to address a group of mobile terminals 12, a group identification number, such as the International Mobile Group Identification (IMGI), is used. A mobile terminal 12 can belong to several groups identified by different IMGIs, which can be stored in the subscriber identity module (SIM). Currently, two IMGI levels are supported: a service provider level and an application level. A service provider IMGI is used to associate mobile terminals 12 with a particular service provider. An application level IMGI is used to identify the applications or services to which the mobile terminal 12 is entitled. Service provider IMGIs can be used, for example, to provide service-related information specific to a particular service provider. An application IMGI is used to provide application level information.

In the present invention, an application level IMGI is used, for example, to identify broadcast information categories defined by the BATS protocol. The interworking function 102 employs a formatter 104 (see FIG. 5) to map BATS information categories to corresponding application level IMGIs. Formatter 104 may comprise a protocol converter to reformat messages already formatted according to the BATS protocol. Alternatively, formatter 104 may receive control information and message data which is then independently formatted for delivery over the Gm interface. Formatter 104 resides between a broadcast message application in the BMC and the Gm interface to the GPRS-SC 40. By mapping BATS information categories into corresponding application level IMGIs, the PTM-M service can be used to deliver broadcast teleservice messages to GPRS-attached mobile terminals 12. A GPRS-attached mobile terminal 12 can then identify the broadcast information contained in a PTM-M message by the application level IMGI.

Figure 5:
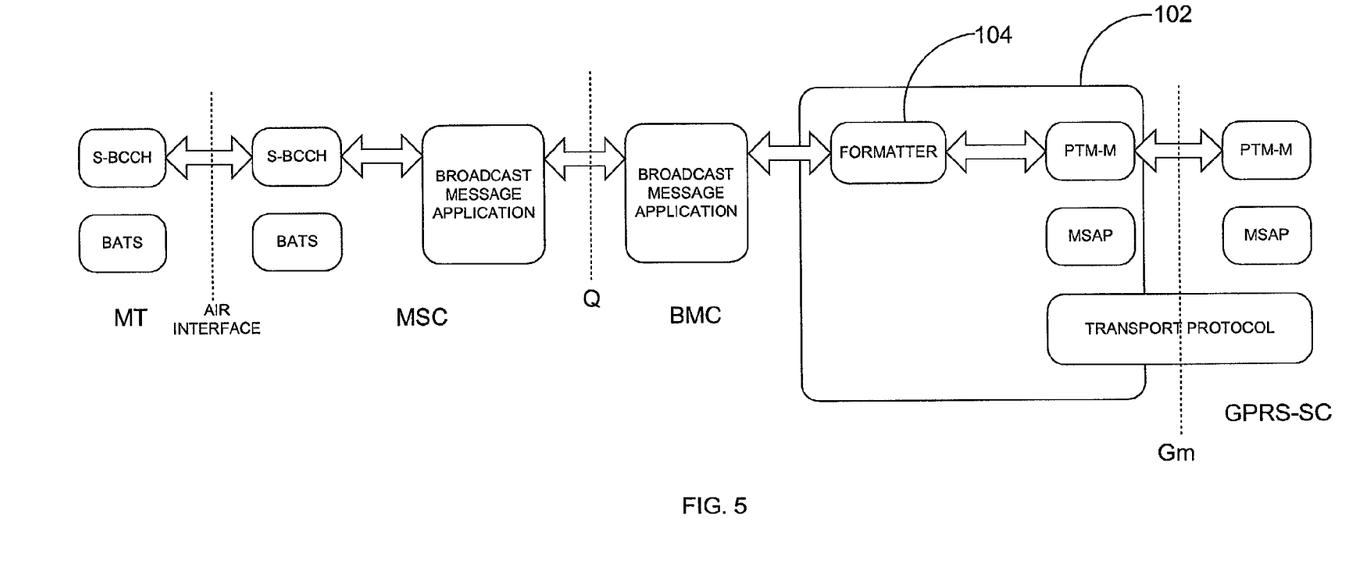
FIG. 5 is a schematic diagram illustrating how messages are delivered from said broadcast message center to said packet-switched network.

FIG. 5 illustrates the operation of IWF 102. Broadcast teleservice messages are sent from a broadcast message application in the BMC 22 to a broadcast message application within the MSC 16 over the Q interface using the BATS protocol for transport. The Q interface is defined in TIA/EIA 136-630. The broadcast message application in the MSC 16 sends the broadcast teleservice message as an S-BCCH to the mobile terminal over the air interface, again using the BATS protocol. Broadcast teleservice messages comprise broadcast channel configuration messages, change notification messages, subchannel schedule messages, and R-DATA messages. These messages are described in TIA/EIA-136-630 and in TIA/EAI/IS-824. Broadcast teleservice messages are passed to the IWF 102 where formatter 104 formats broadcast teleservice messages into PTM-M format suitable for transport over the Gm interface to the GPRS-SC 40. This conversion includes mapping BATS information categories to corresponding application level IMGIs. The resulting PTM-M messages are then transmitted to the GPRS-SC 40 using the MSAP protocol for transport. MSAP delivers PTM-M messages transparently from IWF 102 to the GPRS-SC 40.

In operation, a mobile terminal 12 performs an attach procedure on the packet-switched network 110 and enters the camping state on the PCCCH served by an SGSN 32. The mobile terminal 12 then performs a tunneled registration with the circuit-switched network 120. After entering the camping state, the mobile terminal 12 monitors the paging channel on the PCCCH.

When the BMC 22 schedules a message to be delivered on the S-BCCH, a broadcast teleservice message is sent from the BMC 22 to the MSC 16. The MSC 16 schedules the message using the BATS protocol and sends it out on the broadcast teleservice in the cells corresponding to the service request from the BMC 22. The interworking function 102 converts the broadcast teleservice message into a PTM-M service request for delivery to the GPRS-SC 40. GPRS-SC 40 schedules a PTM-M message to be delivered on the PCCCH in the cells corresponding to the PTM-M service request from the IWF 102 and delivers the PTM-M request to the SGSN 32, which forwards the request to the appropriate base stations 14.

The mobile terminal 12 receives the PTM-M message addressed to its IMGI group on the PCCCH. The IMGI identifies the content of the message so that the mobile terminal 12 can read only those messages of interest to the mobile terminal 12. The mobile terminal 12 can continue monitoring the packet notification channel and paging channel while receiving PTM-M messages since both are on the same physical channel. The mobile terminal 12 monitors the packet notification channel on the packet control channel for a change notification in order to determine if changes have been made to the broadcast information sent on the PTM-M. At the same time, the mobile terminal 12 can continue monitoring the paging channel on the PCCCH.

FIG. 4 shows an alternate network architecture in cases where the network operator for the packet-switched network 110 has not deployed a GPRS-SC 40. In this case, the GPRS-SC functionality is incorporated into the BMC 22 of the circuit-switched network 120. The interworking function 102 translates S-BCCH messages to a format adapted for transmission over the Gn interface to the SGSN 32 as shown in FIG. 4. In this embodiment, the GPRS function within the MSC 16 schedules the message to be sent via the interworking function 102 to the SGSN 32.

From the foregoing, it is apparent that the present invention provides an improved method for delivery of broadcast teleservice messages to a GPRS-attached mobile terminal 12. Using prior art methods, the class B mobile terminal 12 is out of reach on the paging channel of the PCCCH during the time it takes to read broadcast teleservice messages on the S-BCCH. Moreover, the prior art method requires that the change notification feature associated with the BATS protocol be tunneled from the circuit-switched network 120 to the mobile terminal 12 via the SGSN 32 to notify mobile terminals 12 of changes to the content of broadcast teleservice messages. The tunneling of notifications via the SGSN 32 would be slow and bandwidth-consuming when sent as some form of global notification using PTM-M services.

The method of delivering broadcast teleservice messages according to the present invention may also be used advantageously for delivery of service-related information, such as intelligent roaming database (IRDB) downloads. A service operator can, according to the present invention, be identified by an application level IMGI. The same service operator can have multiple service provider level IMGIs corresponding to its subchannels on the S-BCCH. The subchannel numbers on the S-BCCH could then be mapped to the service provider level IMGIs. By using a hierarchical system of IMGIs as described above, service-related information specific to a particular service provider can be delivered to GPRS-attached mobile terminals 12. Using the application level IMGI, the service provider could notify mobile terminals of its service provider level IMGIs used to transmit the service-related information. A broadcast teleservice message using the service provider application level IMGI, referred to herein as a subchannel map message, could be sent to GPRS-attached mobile terminals 12. The subchannel map message comprises a group identification field and a data field. The group identification field contains the application-level IMGI associated with the service provider. The data field contains the service provider level IMGIs and the corresponding subchannel configuration data. Service-related information could then be transmitted in a broadcast teleservice message, referred to herein as a service update message, using the service provider level IMGIs. The service update message comprises a group identification field which contains the service provider IMGI for a corresponding subchannel of the S-BCCH and a data field which contains the service-related data transmitted on the corresponding subchannel.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A communications network comprising:
    a circuit-switched network providing communications services to mobile terminals having service with said circuit-switched network;
    a broadcast teleservice message center connected to said circuit-switched network to generate broadcast teleservice messages formatted according to a first messaging protocol for delivery to mobile terminals having service with said circuit-switched network;
    a packet-switched network providing communication services to mobile terminals having service with said packet-switched network; and
    an interworking function connecting said broadcast teleservice message center to said packet-switched network, said interworking function including a formatter to translate broadcast teleservice messages from the first messaging protocol used in the circuit-switched network into a second messaging protocol used in the packet-switched network for delivery over said packet-switched network to mobile terminals having service with said packet-switched network.

2. The communications network of claim 1 wherein said first messaging protocol is the Broadcast Air-Interface Transport Protocol and said second messaging protocol is the Multicast Service Access Protocol.

3. The communications network of claim 1 wherein said packet-switched network implements the General Packet Radio Service.

4. The communications network according to claim 3 wherein said packet-switched network comprises a point-to-multipoint service center providing point-to-multipoint services.

5. The communications network according to claim 4 wherein said interworking function interfaces with said point-to-multipoint service center over a first interface.

6. The communications network of claim 5 wherein said first interface is a Gm interface.

7. The communications network of claim 1 wherein said packet-switched network comprises a serving GPRS support node.

8. The communications network according to claim 7 wherein said interworking function connects to said serving GPRS support node via a second interface.

9. The communications network according to claim 8 wherein said second interface is a Gn interface.

10. A method for delivering broadcast teleservice messages to mobile terminals over a communications network comprising:
    generating a broadcast teleservice message formatted according to a first messaging protocol in a broadcast teleservice message center;
    transmitting said broadcast teleservice message formatted according to said first messaging protocol over a circuit-switched network to one or more mobile terminals having service with said circuit-switched network;
    translating said broadcast teleservice message from the first messaging protocol used in the circuit-switched network into a second messaging protocol used in a packet-switched network;
    transmitting said broadcast teleservice message formatted according to said second messaging protocol from said broadcast teleservice message center to said packet-switched network; and
    transmitting said broadcast teleservice message formatted according to said second messaging protocol over said packet-switched network to one or more mobile terminals having service in said packet-switched network.

11. The method of claim 10 wherein transmitting said broadcast teleservice message formatted according to said second messaging protocol from said broadcast teleservice message center to said packet-switched network comprises transmitting said broadcast teleservice message formatted according to said second messaging protocol to a point-to-multipoint service center in said packet-switched network.

12. The method of claim 10 further comprising sending a change notification message from said circuit-switched network to said mobile terminals, said change notification message indicating changes in a broadcast channel.

13. The method of claim 10 wherein transmitting said broadcast teleservice message formatted according to said second messaging protocol from said broadcast teleservice message center to said packet-switched network comprises transmitting said broadcast teleservice message formatted according to said second messaging protocol to a serving GPRS support node in said packet-switched network over a second interface.

14. A method for delivering subchannel data transmitted over a circuit-switched network to a mobile terminal having service with a packet-switched network, said method comprising:

assigning a group identification number to a service provider for said circuit-switched network;

assigning a group identification numbers to sub-channels used by said service provider to transmit said sub-channel data;

transmitting said one or more group identification numbers assigned to said sub-channels to mobile terminals registered with said packet-switched network in a first broadcast teleservice message having a group identification field and a data field, said one or more group identification numbers assigned to said sub-channels being contained in said first broadcast teleservice message data field, and said group identification number for said corresponding service provider being contained in said first broadcast teleservice message group identification field; and transmitting sub-channel data to mobile terminals registered in said packet-switched network in a second broadcast teleservice message having a group identification field and a data field, said second broadcast teleservice message group identification field containing a group identification for a selected sub-channel to identify the sub-channel and said second broadcast teleservice message group data field containing said sub-channel data.

15. The method of claim 14 wherein said sub-channel data comprises an Intelligent Roaming Database download message.

16. An interworking function connecting a broadcast teleservice message center to a packet-switched network, said interworking comprising:

a first interface connecting said interworking function to said broadcast message center, wherein said interworking function receives broadcast teleservice messages formatted according to a first messaging protocol over said first interface;

a formatter to translate said broadcast teleservice messages received over said first interface from said first messaging protocol into a second messaging protocol for delivery to mobile terminals having service with a packet-switched network; and a second interface connecting said interworking function to said packet-switched network, wherein said interworking function transmits said broadcast teleservice messages formatted according to said second messaging protocol to said packet switched network over said second interface.

17. The interworking function according to claim 16 wherein said first interface connects to a mobile switching center node in a circuit-switched network.

18. The interworking function according to claim 17 wherein said interworking function interfaces with said point-to-multipoint service center over a first interface.

19. The interworking function according to claim 16 wherein said second interface connects to a serving GPRS support node in said packet-switched network.

20. The interworking function according to claim 19 wherein said second interface is a Gn interface.

21. A broadcast message center in a mobile communication network generating broadcast teleservice messages, said broadcast message center comprising:

a broadcast message application generating said broadcast teleservice messages;

a first interface connecting said broadcast message center to a circuit switched network, wherein said broadcast teleservice messages transmitted over said first interface are formatted according to a first messaging protocol;

an interworking function including a protocol converter to translate said to format said broadcast teleservice messages transmitted over said first interface from said first messaging protocol into a second messaging protocol for delivery to mobile terminals having service with a packet-switched network; and a second interface connecting said interworking function to said packet-switched network, wherein said interworking function transmits said broadcast teleservice messages formatted according to said second messaging protocol to said packet switched network over said second interface.

22. The broadcast message center according to claim 21 wherein said second interface connects to a serving GPRS support node in said packet-switched network.

23. The broadcast message center according to claim 22 wherein said second interface is a Gn interface.

* * * * *